US011819935B2

(12) United States Patent
Schieke et al.

(10) Patent No.: US 11,819,935 B2
(45) Date of Patent: Nov. 21, 2023

(54) METHOD FOR PRECISION MACHINING A WORKPIECE PROVIDED WITH GEARING

(71) Applicant: Präwema Antriebstechnik GmbH, Eschwege/Werra (DE)

(72) Inventors: Jörg Schieke, Erfurt-Marbach (DE); Walter Holderbein, Eschwege (DE); Jörg Reinhardt, Berka v.d.H. (DE)

(73) Assignee: Präwema Antriebstechnik GmbH, Eschwege/Werra (DE)

( * ) Notice: Subject to any disclaimer, the term of this patent is extended or adjusted under 35 U.S.C. 154(b) by 0 days.

(21) Appl. No.: 17/123,345

(22) Filed: Dec. 16, 2020

(65) Prior Publication Data

US 2021/0187642 A1 Jun. 24, 2021

(30) Foreign Application Priority Data

Dec. 18, 2019 (DE) .................... 10 2019 134 924.9

(51) Int. Cl.
*B23F 1/06* (2006.01)

(52) U.S. Cl.
CPC ..................... *B23F 1/06* (2013.01)

(58) Field of Classification Search
CPC ...... B23F 1/02; B23F 1/06; B23F 5/02; B23F 5/16; B23F 5/163; B23F 5/20; B23F 5/202; B23F 19/057
See application file for complete search history.

(56) References Cited

U.S. PATENT DOCUMENTS

| 2013/0266391 A1* | 10/2013 | Schweiker | ........... B23F 17/003 |
| | | | 409/51 |
| 2014/0105698 A1 | 4/2014 | Vogel | |
| 2015/0217389 A1* | 8/2015 | Schieke | ............... B23F 19/057 |
| | | | 451/47 |
| 2019/0321901 A1 | 10/2019 | Schäferling et al. | |

FOREIGN PATENT DOCUMENTS

| CN | 101362230 A | 2/2009 |
| CN | 103328145 A | 9/2013 |
| CN | 103522024 A | 1/2014 |

(Continued)

OTHER PUBLICATIONS

Machine Translation of WO2015198670 (Year: 2015).*

*Primary Examiner* — Kyle A Cook
(74) *Attorney, Agent, or Firm* — THE WEBB LAW FIRM

(57) ABSTRACT

A method for precision machining a workpiece with gearing, wherein teeth of a gear-cutting tool rotating about a rotation axis are brought into engagement with teeth of the workpiece rotating about a workpiece rotation axis, and the gear-cutting tool and the workpiece are moved relative to each other in an axial direction parallel to the workpiece rotation axis. The thickness of the teeth of the gear-cutting tool, starting from an end face, increases in the axial direction until a thickness maximum is reached. The ratio (Bw/Bz) of the width (Bw) of the teeth of the workpiece to the width (Bz) of the teeth of the gear-cutting tool is 2-20. Before and after each pass of the teeth of the gear-cutting tool through the tooth gaps of the workpiece, the thickness maximum of each tooth of the gear-cutting tool is positioned outside the gearing of the workpiece.

13 Claims, 2 Drawing Sheets

(56) References Cited

FOREIGN PATENT DOCUMENTS

| | | |
|---|---:|---:|
| DE | 975164 C | 9/1961 |
| DE | 2060579 A1 | 6/1972 |
| DE | 9409049 U1 | 9/1994 |
| DE | 102018115401 A1 | 1/2020 |
| DE | 102019134924.9 | 11/2020 |
| EP | 20215414.2 | 5/2021 |
| JP | H1094920 A | 4/1998 |
| WO | 2012159942 A1 | 11/2012 |
| WO | 2015198670 A1 | 12/2015 |
| WO | 2018130260 A1 | 7/2018 |

\* cited by examiner

METHOD FOR PRECISION MACHINING A WORKPIECE PROVIDED WITH GEARING

CROSS-REFERENCE TO RELATED APPLICATION

This application claims priority to German Patent Application No. 10 2019 134 924.9 filed Dec. 18, 2019, the disclosure of which is hereby incorporated by reference in its entirety.

BACKGROUND OF THE INVENTION

Field of the Invention

The invention relates to a method for precision machining a workpiece provided with gearing, in which teeth of a gear-shaped gear-cutting tool, which rotates about a rotation axis, are brought into rolling engagement with teeth of the gearing of the workpiece rotating about a rotation axis while the gear-cutting tool and the workpiece are being moved relative to each other in a direction parallel to the rotation axis of the workpiece, wherein the thickness of the teeth of the gear-cutting tool increases to a thickness maximum, in each case starting from the end face of the teeth that faces forward with respect to the corresponding movement in the axial direction.

Description of Related Art

The precision machining carried out according to the invention is typically a gearing or gear honing process in which material of the gearing of the workpiece, which was typically given its basic form by material-removing machining with a defined blade and tempered in prior work steps, is removed using a gear-cutting tool with geometrically undefined cutting edges formed on the teeth thereof. By means of the precision machining, the gearing of the workpiece is given a final geometry, the precision and surface quality of which fulfill the most stringent requirements.

The precision machining tools are typically produced as ceramic-bonded or resin-bonded tools on which gearing is formed, the design of which corresponds to the blank with the gearing to be machined. The precision machining leads to wear on the precision machining tool. To ensure that the form elements (e.g., gearing) that are to be created on the workpiece to be machined by the precision machining satisfy the requirements in terms of their precision, the precision machining tools have to be dressed at specific intervals. By means of the dressing process, the precision machining tool is put into a state in which optimum precision of the machining result along with high material removal performance are ensured.

However, known as an alternative are honing tools that are composed of materials of sufficient hardness and durability that they maintain flawless geometry over long-term use and accordingly do not require routine dressing.

In gear honing, the gear-shaped honing tool and the gear to be machined continuously roll over each other in synchronous rotary movements. In this process, the gearings of the honing tool and of the gear typically mesh at an axis intersection angle, which is set between the skewed rotation axes of the honing tool and of the gear. The rolling rotation and the axis intersection angle give rise to a sliding relative movement between the tooth flanks of the honing tool and the tooth flanks of the gear to be machined in the rolling contact, which movement effects the material removal on the gear. The sliding movement of the honing tool in contact with a tooth flank of the gear is composed of a radial movement generated by the rolling rotation and an axial movement generated by the axis intersection angle.

Simultaneously, the honing tool is moved relative to the gear or the gear is moved relative to the honing tool toward the rotation axis of the gear in order to achieve a uniform machining of the tooth flanks of the gear, over the width thereof. The material removal is typically adjusted via the infeed in the radial direction. If the gear to be honed has helical gearing, then the oscillating movement is effected in the form of a "screw movement" by superimposing a rotation of the gear about its rotation axis on the linear movement of the gear along its rotation axis.

An example of a method as explained above is known from Japanese Utility Model JPH02-82424U. In the known method, use is made of a honing tool with a gearing with teeth, in which a convex layer of hard material is applied to each tooth surface. In this manner, the tooth flanks of the teeth of the gearing are curved outwards from their two opposite end faces in each case. Accordingly, the thickness of the teeth increases from the corresponding end face to a thickness maximum, which is situated in the center between the end faces of the teeth. For the honing, the tool is moved in an axial direction with respect to its rotation axis in the gearing of the workpiece to be machined, which has internal teeth, and thus removes material on the teeth of the workpiece. This process is repeated until all teeth have been machined.

Another method, in which use is made of a gear-cutting tool for precision hard machining, the teeth of which have outwardly curved tooth flanks, is known from WO 2018/130260 A1. In this prior art method, a toothed precision hard machining tool rotating about its rotation axis is brought into rolling machining engagement with the machined gearing in one pass or in several passes of varying radial feed depth in an advancing movement with a directional component parallel to the rotation axis of the machined gearing and at an axis intersection angle other than zero. Material is thus removed from the machined gearing by a tooth flank region of the tool gearing, which has a tooth thickness that increases in the tooth trace direction because of the convex design of the tooth flanks of the end face facing the machined gearing.

The methods known from the prior art explained above are based on the assumption that the width of the gear-cutting tools to be used is in each case greater than the width of the teeth of the gearing provided on the workpiece that are to be machined. The tools used in the prior art thus execute oscillating movements in an axial direction with respect to their rotation axes during the machining, in order to effect or at least support the removal of material. However, these relative movements are limited such that the gear-cutting tool and the workpiece always remain in engagement. In this manner, it is possible to reproduce the shape defined by the geometry of the teeth of the gear-cutting tool in optimum fashion on the teeth of the corresponding machined workpiece while simultaneously attaining maximum service life of the gear-cutting tool.

On the basis of the prior art explained above, the problem that arises is that of creating a method for precision machining workpieces with gearing, with which it is possible to achieve further enhanced removal material performance along with long-term durability.

SUMMARY OF THE INVENTION

The invention has solved this problem by the method as described herein.

In carrying out the method according to the invention and the variants and expansion possibilities thereof described here, persons skilled in the art will obviously supplement them with work steps not explicitly mentioned herein, since they know from their practical experience that such steps are regularly used in carrying out such methods.

Advantageous designs of the invention are given in the dependent claims, and they as well as the general inventive concept will be explained in detail in the following.

In the method according to the invention for the precision machining of a workpiece provided with gearing, as in the prior art described above, teeth of a gear-shaped gear-cutting tool, which rotates about a rotation axis, are brought into rolling engagement with teeth of the gearing of the workpiece rotating about a rotation axis while the gear-cutting tool and the workpiece are being moved relative to each other in a direction parallel to the rotation axis of the workpiece, wherein the thickness of the teeth of the gear-cutting tool increases to a thickness maximum, in each case starting from the end face of the teeth that faces forward with respect to the corresponding movement in the axial direction.

According to the invention, the following applies to the ratio Bw/Bz formed by the width Bw of the teeth of the gearing of the workpiece and the width Bz of the teeth of the gear-cutting tool:

$$2 \leq Bw/Bz \leq 20$$

According to the invention, the gear-cutting tool is simultaneously positioned, before each pass of its teeth through the tooth gaps of the gearing of the workpiece in the corresponding axial direction, at a position in which the thickness maximum of the teeth of the gear-cutting tool is situated outside the gearing of the workpiece. As a consequence of the relative movement of the workpiece and the gear-cutting tool in the axial direction AX+, AX−, the teeth of the gear-cutting tool then pass through the respective tooth gaps of the gearing of the workpiece assigned to them until the thickness maximum of each tooth has exited from the tooth gap assigned to the tooth.

The method according to the invention is therefore based on the use of a gear-shaped gear-cutting tool capable of being paired in each case with the workpiece to be machined and having teeth that are narrow compared to the teeth of the gearing of the workpiece. Because the width of the teeth of the gear-cutting tool is at most half, in particular at most a third ($3 \leq Bw/Bz$) or at most a fourth ($4 \leq Bw/Bz$) of the width of the teeth of the workpiece, the gear-cutting tool can be positioned, with relatively little travel, outside the workpiece before each pass through the tooth gaps of the workpiece, in such a way that the end face of the teeth that faces forward in the direction of the axial movement is situated outside the gearing of the workpiece.

The radial position of the gear-cutting tool with respect to the workpiece can thus be adjusted such that a sufficient amount of material is removed during the subsequent pass of the teeth of the gear-cutting tool through the gearing of the workpiece.

Crucial for the invention is that, for the precision machining, the gear-cutting tool with its teeth must always be moved at least far enough through the gearing of the workpiece in the axial direction until the place at which the corresponding tooth of the gear-cutting tool has its greatest thickness has left the tooth gap of the workpiece. If several passes are completed during the precision machining of the invention, i.e. the teeth of the gear-cutting tool are moved multiple times in an axial direction through the tooth gaps of the workpiece, then for practical purposes the relative movement in an axial direction is always continued until the thickest places of all teeth of the gear-cutting tool have left the tooth gaps of the workpiece and the infeed in the radial direction required for the desired material removal in the next pass can take place.

In the method according to the invention, the material removal takes place such that the teeth of the gear-cutting tool initially come into engagement, with their end faces, with the assigned tooth gaps of the gearing of the workpiece, where they have the least thickness, in each case. The removal of material on the tooth of the workpiece that comes into contact with the tooth of the gear-cutting tool in each case thus starts immediately with the engagement. With continued axial movement, the teeth, which increase in thickness from their end faces on, penetrate deeper and deeper into the material of the teeth of the gearing of the workpiece, such that more material is continuously removed from the teeth of the gearing of the workpiece until the thickness maximum of the teeth of the gear-cutting tool is reached. The volume of material removed by the teeth of the gear-cutting tool and the load associated therewith can thus be established directly by the design of the increase in thickness of the teeth of the gear-cutting tool.

Because this increase is continuous, it is possible to avoid erratically changing loads. Particularly uniform loads are thus achievable if the increase in thickness is linear. However, if particularly high levels of precision must be ensured during the manufacturing process, it also makes sense to configure the increase in thickness not as linear, but instead according to a function in which more material is removed in an area adjoining the end face that initially comes into engagement with the gearing of the workpiece rather than in a subsequent area. Such a configuration is achievable if, for example, the increase in the thickness of the teeth follows a circular or elliptical function.

With the method according to the invention and with appropriate dimensioning of the load capacity and the shape of the teeth of the gear-cutting tool, it is possible to maximize the removal of material achieved on at least one tooth flank of the teeth bordering the relevant tooth gap during the pass through the respective tooth gaps of the gearing of the workpiece. This can take place to the extent that the finished size of the gearing geometry is achieved in just one pass.

When the method according to the invention is implemented, the process forces are significantly reduced because of the small size of the surface where there is contact between the gearing of the gear-cutting tool and of the workpiece, in comparison to such methods in which use is made of tools having a tooth width that is at least as great as the width of the teeth of the workpiece to be processed.

A radial infeed of the gear-cutting tool toward the workpiece during an axial pass executed according to the invention is not required in the method according to the invention. In such cases in which greater material removals are required in order to reproduce the desired final geometry on the teeth of the gearing of the workpiece, the relative movement between the workpiece and the gear-cutting tool can instead be completed in two or more passes, wherein between the end of the previous pass and the beginning of the next pass, the relative position of the workpiece and of the gear-cutting tool is changed in a radial direction, such that an optimum material removal takes place per pass. As already mentioned, to this end the relative movement in the axial direction is always continued until the thickest place of the teeth of the gear-cutting tool is situated outside the tooth gaps and an infeed in the radial direction can take place.

In principle, the method according to the invention is suitable for machining all workpieces provided with gearing, for which a rolling engagement between the gearing of the gear-cutting tool and the gearing of the workpiece, with simultaneous relative movement of the workpiece and the tool in an axial direction with respect to the rotation axis of the workpiece, is possible during the machining. The method according to the invention turns out to be particularly practice-oriented for the precision machining of gears that rotate about a workpiece rotation axis during the machining. This includes in particular the precision machining of gears with internal teeth for which gear-cutting tools with external teeth are used. In a manner known per se, material removal performance can be enhanced if the rotation axes of the gear-cutting tool and of the workpiece are aligned at an axis intersection angle.

In principle, the relative movement of the workpiece and the gear-cutting tool executed in the method according to the invention can be implemented by the workpiece or the gear-cutting tool being moved, wherein even a movement of the workpiece and of the gear-cutting tool in respective opposite axial directions is possible. In practice, it has been shown that a practical implementation of the method according to the invention is particularly easy and leads to optimized work results if only the workpiece is moved in the axial direction while the gear-cutting tool remains stationary with respect to the axial direction and only rotates about its rotation axis during the machining process.

In order for a gear-cutting tool that is used and designed according to the invention to be able to bear the loads imposed on it during use, the teeth thereof must have a specific minimum width. In practice, it has been shown that the width of the teeth should not be less than a twentieth of the width of the teeth of the workpiece to be machined in each case. Actual practice shows that the method according to the invention can be implemented in a particularly reliable fashion if the following applies to the ratio $B_w/B_z$:

$$2 < B_w/B_z < 20,$$

wherein ratios $B_w/B_z$ to which the following applies:

$$2 < B_w/B_z < 5$$

are particularly advantageous in terms of the durability of the gear-cutting tool.

In principle, in the method according to the invention it is possible, in each case starting from a starting position in which one of the end faces of the teeth of the gear-cutting tool is situated in front of the assigned first end face of the teeth of the gearing of the workpiece, to carry out the movement of the tool through the gearing of the workpiece in a manner according to the invention until the other end face of the teeth of the gear-cutting tool in each case is situated outside the gearing of the workpiece adjacent to the second end face of the teeth of the gearing of the workpiece opposite the first end face, in order to move the tool back into the starting position without bringing it into engagement with the gearing of the workpiece and, if necessary after a radial infeed of the gear-cutting tool to the gearing of the workpiece, to start a new pass.

However, and particularly in cases in which more than one pass is required in order to precision machine the gearing of the workpiece to the final dimensions, it turns out to be advantageous in terms of the effectiveness of the implementation of the method of the invention if the relative movement between the workpiece and the gear-cutting tool is effected in a periodically changing axial direction, wherein in this case the thickness maximum of the teeth of the gearing of the gear-cutting tool should always be situated between the end faces of the gearing, and the thicknesses of the teeth of the gear-cutting tool should increase to the thickness maximum of the respective teeth, starting from each of the end faces thereof. In this design, the teeth of the gear-cutting tool, which in this case is moved back and forth in an oscillating manner between two reversing positions of the axial movement as well as in engagement with the workpiece during the forward movement and the backward movement, so that material is removed from at least one of the tooth flanks of the teeth of the workpiece bordering the corresponding tooth gap during both the forward movement and the backward movement. In terms of the uniformity of the material removal, it is expedient to configure the thickness maximum of the teeth of the gear-cutting tool in the center between the end faces of the teeth.

The tool can be composed of all materials known to the prior art for the production of honing tools and the like. For example, the tool can be embodied such that, after a certain period of use, it can be dressed in order to resharpen its geometry such that an optimum size accuracy in terms of the geometric requirements is obtained on the teeth of the workpiece that are machined according to the invention. It is also possible to produce a flat steel product used and designed according to the invention from materials that render dressing unnecessary and that in themselves ensure sufficiently long-term durability of the workpiece.

The size of the area in which there is contact between the corresponding tooth of the gear-cutting tool and the corresponding tooth of the workpiece, which is minimized with the inventive procedure, makes it possible to carry out the relative movement between the gear-cutting tool and the workpiece in such a way that additional form elements are reproduced on each machined tooth of the workpiece. It is thus possible to superimpose movements about at least one further axis, such as a radial infeed during the corresponding pass, on the relative movement that according to the invention always takes place in the axial direction with respect to the rotation axis of the workpiece, in order to create specific form elements (for instance, a specific crowning, a conicity or an end relief) on the teeth of the workpiece.

BRIEF DESCRIPTION OF THE DRAWINGS

In the following, the invention will be explained in more detail, with reference to a drawing depicting an exemplary embodiment. Shown schematically in each case are.

DESCRIPTION OF THE PREFERRED EMBODIMENTS

Figure 1:
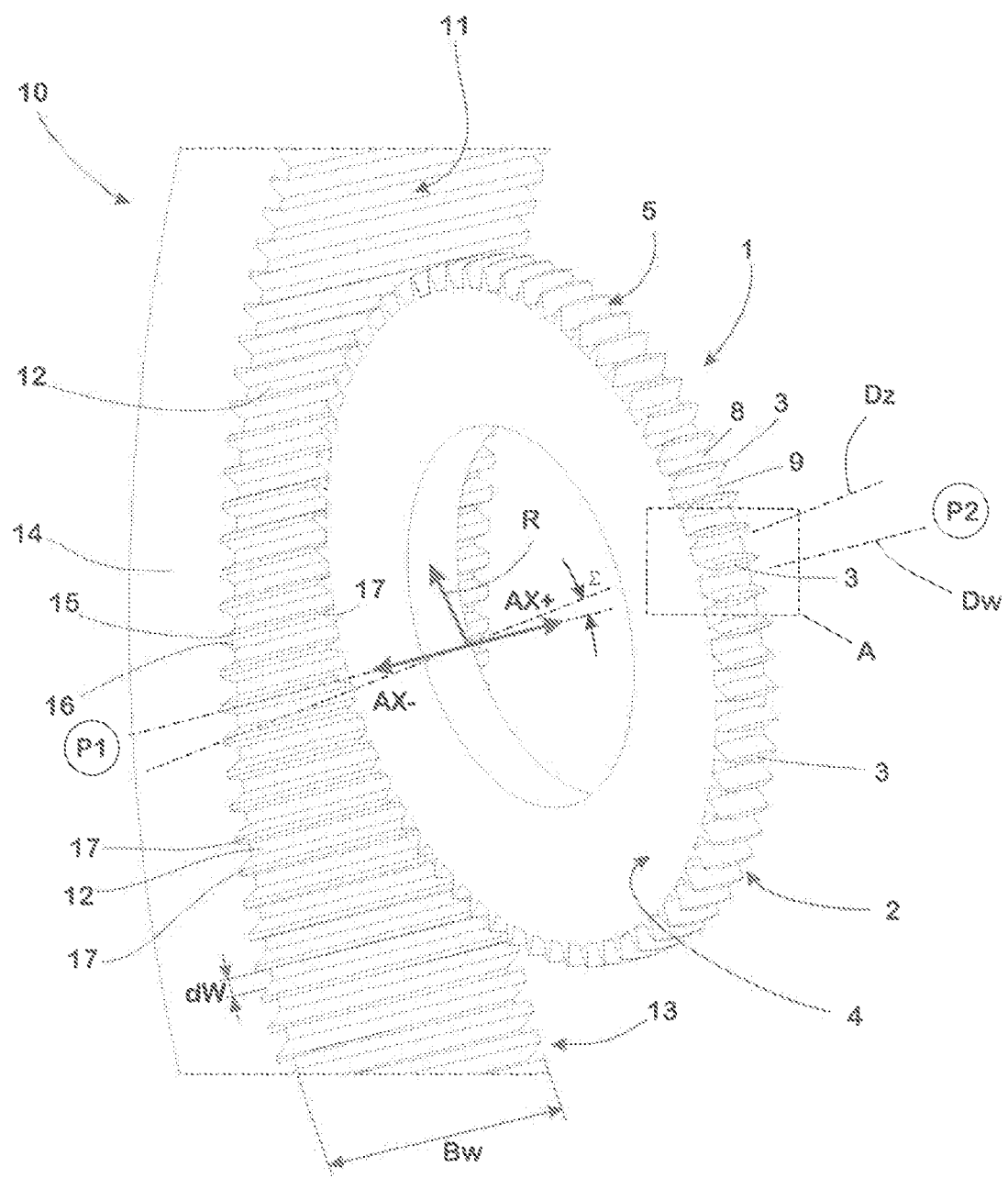
FIG. 1 a gear-cutting tool with external gearing in engagement with the internal gearing of a workpiece, in a perspective view.
Figure 2:
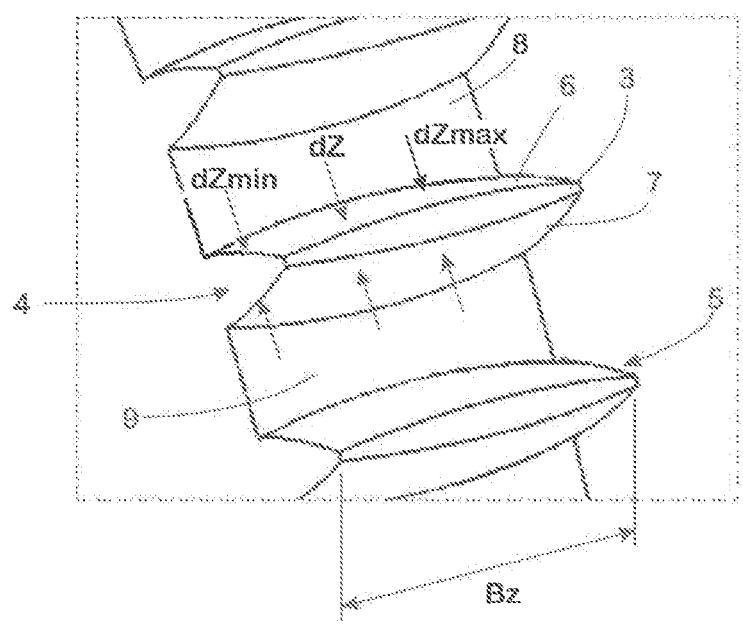
FIG. 2 an enlarged detail A from FIG. 1.

The gear-cutting tool 1 produced from a material typically used in the prior art is held in a tool holder, which is not shown here for the sake of clarity and which in turn is coupled in a manner known per se to a rotary drive, via which the gear-cutting tool 1 in use is driven to rotate about a tool rotation axis Dz.

The gear-cutting tool 1 has an external gearing 2 configured as spur gearing, which is formed in standard fashion by a multiplicity of teeth 3 distributed at uniform angular distances about the tool rotation axis Dz. The teeth 3 are each aligned in an axis-parallel manner to the tool rotation axis Dz, and extend over the width Bz of the gear-cutting tool 1, between the end faces 4, 5 of the gear-cutting tool 1.

Each tooth 3 has tooth flanks 6, 7, one of which in each case is assigned to the tooth gaps 8, 9 of the gearing 2 of the gear-cutting tool 1, which are bordered on one of their sides by the corresponding tooth 3. The tooth flanks 6, 7 are curved outwards toward the corresponding tooth gap 8, 9. The tooth trace of the tooth flanks 6, 7 thus describes a circular arc, in other words it follows a circular function such that the teeth 3 each have a minimum thickness dZmin at each of their ends assigned to the end faces 4, 5, and such that the thickness dZ of the teeth 3 continuously increases in the axial direction with respect to the tool rotation axis Dz, starting from the minimum thickness dZmin of the teeth 3, until a thickness maximum dZmax is reached, which is situated exactly in the center of the teeth 3 with respect to the width Bz.

The workpiece 10 that is to be precision machined in a manner according to the invention is a standard gear provided with internal gearing 11 configured as helical gearing, which was formed from a blank by material-removing machining and then tempered.

The workpiece 10 is clamped in a workpiece holder, which is not shown here for the sake of clarity and which is coupled to a rotary drive, which is also not shown here and which drives the workpiece 10 to rotate about a rotation axis Dw in use. The rotation axis Dw is aligned in standard fashion at an axis intersection angle Σ with respect to the rotation axis Dz of the gear-cutting tool 1.

Furthermore, the workpiece holder is mounted on a positioning drive, not shown, which is provided for moving the workpiece holder with the workpiece 10, in use, back and forth in an oscillating manner between two reversing positions P1, P2 in the axial direction AX+, AX− with respect to the workpiece rotation axis Dw, wherein the axial direction in the forwards movement is designated by "Ax+" and the opposite axial direction in the backwards movement of the workpiece 10 is designated by "Ax−". By means of the positioning mechanism, further movements about additional axes (e.g., an infeed in the radial direction R) can be superimposed on the movements of the workpiece 10 in the axial direction AX+, AX− if, in addition to removing material in linear fashion from the tooth flanks, specific form elements (such as a crowning) are to be reproduced on them as well.

In contrast to the workpiece 10, the gear-cutting tool 1 is only rotated about its rotation axis Dw and not moved in axial direction AX+, AX− during the machining of the workpiece 10.

The teeth 12 of the internal gearing 11 of the workpiece 10 each extend between the end faces 13, 14 of the workpiece 10 over a width Bw and have a constant thickness dW over the width Bw. Adjacent teeth 12 in each case delimit a tooth gap 17 between themselves with their tooth flanks 15, 16.

The width Bw of the teeth 12 of the gearing 11 of the workpiece 10 is significantly greater than the width Bz of the gear-cutting tool 1. In the example shown here, the ratio Bw/Bz is thus ca. 6:1.

The workpiece 10 is moved into the first reversing position P1 for the precision machining of the teeth 12 of the internal gearing 11. This position is situated outside the external gearing 2 of the gear-cutting tool 1 such that in this position P1, the front end face 13 of the workpiece 10 in the axial direction AX+ is arranged immediately adjacently to the end face 13 of the gear-cutting tool 1.

The gear-cutting tool 1 is fed in to the internal gearing 11 in a radial direction R, to an extent that corresponds to the depth over which material is to be removed from the tooth flanks 15, 16 of the teeth 12 in the next pass completed by the teeth 3 of the gear-cutting tool 1 through the tooth gaps 17 of the workpiece 10.

By the workpiece 10 being continuously advanced axially along its rotation axis Dz in the axial direction AX+ relative to the gear-cutting tool 1, the gearings 2, 11 of the gear-cutting tool 1 and of the workpiece 10 driven in codirectional rotation about their respective rotation axes Dz, Dw are brought into rolling engagement.

As a consequence of the rolling engagement and of the radial infeed, the teeth 3 of the gear-cutting tool 1 now remove material from the tooth flanks 15, 16 of the teeth 12. In this process, the less thick region of the teeth 3 of the gear-cutting tool 1, which abuts on the rear end face 4 of the gear-cutting tool 1 (with respect to the present direction AX+ of the axial movement), first comes in engagement with the assigned teeth 12 of the workpiece 10 in such a way that removal of material starts immediately on the tooth 12 of the workpiece 10 that comes in contact with the corresponding tooth 3 of the gear-cutting tool 1. With continued movement of the workpiece 10 in the axial direction AX+, the teeth 3 of the gear-cutting tool 1, which increase in thickness from the end face 4 on, penetrate deeper and deeper into the material of the teeth 12 of the workpiece 10, such that more and more material is removed from the teeth 12 until the thickness maximum dZmax of the teeth of the gear-cutting tool 1 is reached.

Due to the movement in the axial direction AX+, the rear end face 14 of the workpiece 10 (with respect to the axial direction AX+) approaches the front end face 5 of the gear-cutting tool 1 (with respect to the axial direction AX+), whereas the front end face 13 of the workpiece 10 (with respect to the axial direction AX+) moves away from the rear end face 4 of the gear-cutting tool 1 (when viewed in the axial direction AX+).

The advancing movement of the gear-cutting tool 1 in the axial direction AX+ is continued until the place where the teeth 3 have their greatest thickness dZmax is situated outside the gearing 11 of the workpiece 10. In this position, the workpiece 10 has reached the second reversing position P2 of its axial movement. The first pass of the teeth 3 of the gear-cutting tool 1 through the teeth 12 of the gearing 11 of the workpiece 10 is thus completed.

If the material removal on the teeth 12 of the workpiece 10 effected by the first pass is insufficient for providing the gearing 11 of the workpiece 10 with the required final geometry, a second pass can now be made. To this end, the gear-cutting tool 1, if need be after a further infeed in the radial direction R, is moved from the reversing position P2 in the opposite axial direction AX− back through the gearing 11 of the workpiece 10 until the reversing position P1 is reached and the second pass is completed.

If required, further passes in the manner explained above are made until the teeth 12 of the workpiece 10 have the required final geometry.

With the invention, a method is provided for the precision machining of a workpiece 10 having gearing 11, wherein teeth 3 of a gear-cutting tool 1 rotating about a rotation axis Dz are brought into rolling engagement with teeth 12 of the gearing 11 of the workpiece 10 rotating about a rotation axis Dw, and wherein the gear-cutting tool 1 and the workpiece 10 are moved relative to each other in an axial direction AX+, AX− parallel to the rotation axis Dw of the workpiece 10. The thickness dZ of the teeth 3 of the gear-cutting tool 1 increases from a front end face 4, 5 of the teeth (with respect to the corresponding movement in axial direction AX+, AX−) to a thickness maximum dZmax. In order to achieve further enhanced removal performances along with long-term durability, according to the invention the following applies to the ratio Bw/Bz formed by the width Bw of the teeth 12 of the workpiece 10 and the width Bz of the teeth 3 of the gear-cutting tool 1: 2≤Bw/Bz≤20. Before each pass of its teeth 3 through the tooth gaps 17 of the workpiece 10 in the respective axial directions AX+, AX−, the gear-cutting tool 1 is in each case positioned at a position P1, P2 in which the thickness maximum dZmax of the teeth 3 of the gear-cutting tool 1 is situated outside the gearing 11 of the workpiece 10. As a result of the relative movement of the workpiece 10 and of the gear-cutting tool 1, the teeth of the gear-cutting tool 1 then travel in the axial direction AX+, AX− until the thickness maximum dZmax of each tooth 3 of the gear-cutting tool 1 exits its assigned tooth gap 17 of the gearing 11 of the workpiece 10.

According to the invention, for the precision machining of a workpiece 10 provided with gearing 11 and rotating about a rotation axis Dw, teeth 3 of a gear-cutting tool 1 rotating about a rotation axis Dz are thus brought into engagement with teeth 12 of the workpiece 10, and the gear-cutting tool 1 and the workpiece 10 are moved relative to each other in a direction AX+, AX− parallel to the rotation axis Dw. The thickness dZ of the teeth 3 of the gear-cutting tool 1 increases to a thickness maximum dZmax, starting in each case from the front end faces 4, 5 of the teeth (in the axial direction AX+, AX−). A high removal performance and long-term durability of the gear-cutting tool 1 are achieved in that, according to the invention, the following applies:

$$2 \leq Bw/Bz \leq 20$$

wherein BW=width Bw of the teeth of the gearing 11 of the workpiece 10,

Bz=width of the teeth 3 of the gear-cutting tool 1, that the gear-cutting tool 1 is positioned, before each pass of its teeth 3 through the tooth gaps 17 of the workpiece in the respective axial directions AX+, AX−, at a position P1, P2 in which the thickness maximum dZmax of the teeth 3 of the gear-cutting tool 1 is situated outside the gearing 11 of the workpiece 10, and that the teeth 3 of the gear-cutting tool 1 are moved as a result of the relative movement of the workpiece 10 and of the gear-cutting tool 1 in the axial direction AX+, AX− through their assigned tooth gaps 17 of the gearing 11 of the workpiece 10, until the thickness maximum dZmax of each tooth 3 has exited the assigned tooth gap 17.

REFERENCE SYMBOLS

1 Gear-cutting tool
2 External gearing of the gear-cutting tool 1
3 Teeth of the external gearing 2
4,5 End faces
6,7 Tooth flanks of the teeth 3
8,9 Tooth gaps of the gearing 2
Workpiece (gear with internal teeth)
11 Internal gearing of the workpiece 10
12 Teeth of the internal gearing 11
13,14 End faces of the workpiece 10
15,16 Tooth flanks of the teeth 12
17 Tooth gaps of the workpiece 10
AX+, AX− Axial direction
Bw Width of the workpiece 10
Bz Width of the gear-cutting tool 1
Dw Rotation axis of the workpiece 10
Dz Tool rotation axis
dZ Thickness of the teeth 3
dZmin Minimum thickness of the teeth 3 of the gear-cutting tool 1
dZmax Maximum thickness of the teeth 3 of the gear-cutting tool 1
dW Thickness of the teeth 12
P1, P2 Reversing positions
R Radial direction
Σ Axis intersection angle

The invention claimed is:

1. A method for precision machining a workpiece provided with gearing, the method comprising:
bringing teeth of a gear-shaped gear-cutting tool, which is rotating about a gear-cutting tool rotation axis, into rolling engagement with teeth of the gearing of the workpiece, which is rotating about a workpiece rotation axis; and
moving the gear-cutting tool and the workpiece relative to each other in an axial direction parallel to the workpiece rotation axis,
wherein a thickness of the teeth of the gear-cutting tool increases, in each case, starting from an end face of the teeth facing forward with respect to the movement in the axial direction, until a thickness maximum is reached,
wherein a ratio, Bw/Bz, of a width, Bw, of the teeth of the gearing of the workpiece and a width, Bz, of the teeth of the gear-cutting tool is 2≤Bw/Bz≤20,
wherein the gear-cutting tool, before each pass of the teeth of the gear-cutting tool through tooth gaps of the gearing of the workpiece in the axial direction, is positioned at a position in which the thickness maximum of the teeth of the gear-cutting tool is situated outside the gearing of the workpiece,
wherein the teeth of the gear-cutting tool, as a consequence of the relative movement of the workpiece and of the gear-cutting tool in the axial direction, are each moved through the corresponding tooth gaps of the gearing of the workpiece until the thickness maximum of each tooth has exited from the corresponding tooth gap, and
wherein the axial relative movement between the workpiece and the gear-cutting tool is effected in a periodically changing direction, the thickness maximum of each tooth of the gear-cutting tool is situated between end faces of each tooth, the thickness of each tooth of the gear-cutting tool increases to the thickness maximum starting from each of the end faces of each tooth, and the gear-cutting tool, which is moved back and forth in an oscillating manner between two opposite axial positions of the axial relative movement, is in engagement with the workpiece during forward movement and backward movement.

2. The method according to claim 1, wherein only the workpiece is moved in the axial direction.

3. The method according to claim 1, wherein the thickness maximum of each tooth is formed in a center between the end faces of each tooth.

4. The method according to claim 1, wherein the ratio Bw/Bz is 2<Bw/Bz<20.

5. The method according to claim 4, wherein the ratio Bw/Bz is 2<Bw/Bz<5.

6. The method according to claim 1, wherein the relative movement in the axial direction is completed in two or more passes.

7. The method according to claim 6, wherein an infeed in the radial direction is effected after each pass.

8. The method according to claim 1, wherein the thickness of each of the teeth of the gear-cutting tool increases continuously to the thickness maximum, starting from the end face of each tooth.

9. The method according to claim 8, wherein the increase of the thickness follows a circular function.

10. The method according to claim 8, wherein the increase of the thickness follows an elliptical function.

11. The method according to claim 1, wherein the workpiece is a gear rotating about the workpiece rotation axis during the precision machining.

12. The method according to claim 11, wherein the gear-cutting tool rotation axis is aligned at an axis intersection angle with respect to the workpiece rotation axis.

13. The method according to claim 11, wherein the gearing of the workpiece is an internal gearing and gearing of the gear-cutting tool is an external gearing.

* * * * *